(12) United States Patent
Monteilliet et al.

(10) Patent No.: US 9,719,661 B2
(45) Date of Patent: Aug. 1, 2017

(54) LIGHTING LENS FOR BIOMETRIC MEASUREMENT DEVICE

(71) Applicant: Joël-Yann Fourre, Issy les Moulineaux (FR)

(72) Inventors: Gilles Monteilliet, Issy les Moulineaux (FR); Joël-Yann Fourre, Issy les Moulineaux (FR)

(73) Assignee: Morpho, Issy les Moulineaux (FR)

( * ) Notice: Subject to any disclaimer, the term of this patent is extended or adjusted under 35 U.S.C. 154(b) by 57 days.

(21) Appl. No.: 14/673,579

(22) Filed: Mar. 30, 2015

(65) Prior Publication Data

US 2015/0276180 A1 Oct. 1, 2015

(30) Foreign Application Priority Data

Mar. 31, 2014 (FR) ...................................... 14 00782

(51) Int. Cl.
| | |
|---|---|
| F21V 13/04 | (2006.01) |
| F21V 7/06 | (2006.01) |
| F21V 7/08 | (2006.01) |
| G06K 9/00 | (2006.01) |
| G02B 19/00 | (2006.01) |
| G02B 17/08 | (2006.01) |

(52) U.S. Cl.
CPC ................ F21V 13/04 (2013.01); F21V 7/06 (2013.01); F21V 7/08 (2013.01); G02B 19/0028 (2013.01); G02B 19/0061 (2013.01); G06K 9/00046 (2013.01); G02B 17/086 (2013.01)

(58) Field of Classification Search
CPC ........... F21V 13/00; F21V 13/02; F21V 13/04
USPC .................... 348/77; 382/124, 125, 126, 127
See application file for complete search history.

(56) References Cited

U.S. PATENT DOCUMENTS

| | | | |
|---|---|---|---|
| 2003/0214815 A1* | 11/2003 | Ishida | .................. F21S 48/1159 |
| | | | 362/516 |
| 2006/0285347 A1 | 12/2006 | Okada | |
| 2009/0257050 A1* | 10/2009 | Pertzov | .............. G01N 21/8806 |
| | | | 356/237.1 |

(Continued)

FOREIGN PATENT DOCUMENTS

| | | |
|---|---|---|
| EP | 0 280 041 A1 | 8/1988 |
| EP | 1 357 333 A2 | 10/2003 |
| JP | 2012-38678 A | 2/2012 |

(Continued)

OTHER PUBLICATIONS

Rapport de Recherche Préliminaire et Opinion Écrite, mailed Nov. 28, 2014, issued in corresponding French Application No. 1400782, filed Mar. 31, 2014, 7 pages.

*Primary Examiner* — Jaime Atala
*Assistant Examiner* — Ayman Abaza
(74) *Attorney, Agent, or Firm* — Christensen O'Connor Johnson Kindness PLLC (57) ABSTRACT

A lighting lens for a biometric measurement device comprises a paraboloidal or ellipsoidal reflector with symmetry of revolution, and a dioptric surface that has two different refractive power values in two perpendicular directions, said two refractive power values being negative or zero. Such a lens can be produced in the form of a block of transparent material and be used in a biometric measurement device. In particular, it makes it possible to capture skin prints as an image with an exposure time that is short.

17 Claims, 4 Drawing Sheets

(56) References Cited

U.S. PATENT DOCUMENTS

2011/0122060 A1* 5/2011 Westerweck ....... G02B 27/0977
  345/156
2015/0294133 A1* 10/2015 Picard ................ G06K 9/00033
  382/124

FOREIGN PATENT DOCUMENTS

| JP | 2012038678 A | * | 2/2012 |
| WO | 2005/048362 A1 | | 5/2005 |
| WO | 2011/028620 A1 | | 3/2011 |

* cited by examiner

LIGHTING LENS FOR BIOMETRIC MEASUREMENT DEVICE

FIELD OF THE INVENTION

The present invention generally concerns a lighting lens, a lighting assembly and a biometric measurement device that comprises such a lighting lens or assembly.

BACKGROUND

A lighting assembly usually comprises a light source and a lighting lens, the purpose of which is to collect the light that is produced by the source, and to distribute it within a light beam with a beam form which suits the use of this light. For this purpose, the lighting lens must suit the light source, in particular the form of the light emission zone of this source. In addition, the characteristics of the light beam that is produced by the lighting lens must correspond to the optical field to be illuminated and to the content thereof. Thus the performance of a lighting lens comprises its collection efficiency, that is to say the proportion of the light energy that is emitted by the source and which produces useful illumination. Other characteristics are in particular the size of the optical field that is illuminated, the uniformity or distribution of the lighting in this field, the angle magnitude of the beam, etc.

Particular difficulties may concern the production of illuminations in which the light beam is inclined with respect to an object plane, for example a focusing plane of an image capture apparatus. Light beam inclined with respect to a plane means a spatial configuration in which a mean direction of the beam forms an angle that is non-zero and less than 90° to a direction perpendicular to the plane. The form of the beam must then be adapted according to this inclination so that the entire required part of the object plane is suitably illuminated.

Other criteria that concern a lighting lens are its compatibility with a light power value that is sought, compatibility with any device cooling the light source, its size, the ease of assembly with the light source and the rest of the device, and its cost price.

Particular applications of lighting assemblies are biometric measurement devices. Such devices may in particular produce skin print images, images of the face, iris, subcutaneous venous networks of a finger or palm, etc. At least some of these devices may further need the following requirements:

sufficiently uniform lighting for an optical field that may be wide and have a cross-section elongated in one direction;

sufficiently intense illumination, in particular when the object to be photographed may be movable;

lighting that keeps its qualities when the object is moved perpendicular to the object plane, in particular over a field depth range that is desired for the image capture apparatus; and a lighting direction that may be oblique with respect to the object plane, in particular for a contactless skin print sensor, and also possibly for capturing a face image.

Lighting lenses known before the present invention, which are suitable for light emitting diodes, each consists of a dioptric central lens part, typically a convergent or positive lens, and a peripheral lens part, such as a parabolic reflector. Such lighting lens constitutes a collimator, with a light collecting efficiency which is in general only around 50%. The light beam that is produced at the output has a parallel beam structure and is not well suited to illuminating evenly an optical field the dimensions of which are typically $80\times30\times45$ mm$^3$. Furthermore, because of the composite structure of the light beam that is produced by such a lighting lens, it is very difficult to confer divergence on this light beam without light and dark rings appearing in the useful space that is illuminated. In other words, such lenses with a mixed dioptric/catadioptric structure are not suitable for producing illumination that is both divergent and uniform.

SUMMARY

An object of the invention, among others, is to propose a novel lighting lens for a biometric device, for which at least one or more of the aforementioned characteristics are improved compared with the lenses already existing.

According to an aspect of the invention, the lighting lens comprises:

a paraboloidal or ellipsoidal reflector, which is formed by a portion of a paraboloid or ellipsoid with symmetry of revolution about an axis of this reflector, and which has a focus point; and a dioptric surface, arranged so that a light beam that originates from the focus point and is then reflected by the reflector next passes through the dioptric surface.

The lighting lens according to an aspect of the invention is characterised in that the dioptric surface has two different refractive power values in two directions that are perpendicular to each other and parallel to the dioptric surface, and these two refractive power values are negative.

For light rays that originate from the focus point, the reflector has a collimator function or a convergent optical component function.

Downstream of the reflector along the light rays, the dioptric surface has a divergent optical component function. In this way, the light beam can illuminate a wide optical field evenly. Furthermore, the partially cylindrical nature of the dioptric surface provides the light beam with a cross-section form that is suitable for an optical field elongated transversely in one direction. The form of the cross-section of the beam may also suit a lighting configuration that is oblique with respect to an object plane.

A lighting lens according to an aspect of the invention can be produced simply and economically. Furthermore, it gives rise to a small space requirement, which is compatible with small devices in which this lens can be integrated.

In addition, a lighting lens according to an aspect of the invention can be simply adapted according to the light source with which it is associated in order to obtain a light collection efficiency that is high. This is because, when the light source is situated around the focus point of the reflector, the reflector occupies an angular sector that is wide compared with the source so that a high proportion of the light is directed through the dioptric surface.

In addition, a lighting lens according to an aspect of the invention can be adapted simply according to the size of the light source, in particular by applying an isotropic homothetic transformation with the focus of the reflector as its pole.

Finally, a lighting lens according to an aspect of the invention may have a light entry face with a form of this entry face which is adapted according to a light emission zone of the light source in order to increase the collection efficiency of the lighting assembly even more. In particular, the entry face of the lighting lens may be planar when the emission zone of the light source is itself planar, and the entry face may be planar or spherical when the emission zone is itself spherical.

The following improvements may advantageously be used in some embodiments of the invention, separately or in combination of a plurality of them:

the reflector may be a portion of a paraboloid of revolution that has a radius of between 8 mm and 45 mm, preferably between 25 mm and 35 mm, in particular substantially equal to 30.5 mm;

one of the two refractive power values of the dioptric surface may be between 20% and 80% of the other value, preferentially between 40% and 60% of this other value, in particular substantially equal to 57% thereof;

a first one of the two refractive power values of the dioptric surface may be between −30 dioptres and 0 dioptre, preferably between −10 dioptres and −3 dioptres, in particular substantially equal to −5 dioptres, and a second of the two refractive power values of the lens surface may be between −40 dioptres and −1 dioptre, preferably between −20 dioptres and −5 dioptres, in particular substantially equal to −10 dioptres; and the lighting lens may be arranged so that any light ray that originates from the focus point and is then reflected by the reflector and next passes through the dioptric surface has, before being reflected, an angle of inclination with respect to the axis of the reflector that is between 5° and 120°.

In some embodiments of the invention, the lighting lens may comprise a block of transparent material with two opposite lateral ends, with an entry face, an intermediate face and an exit face, the three faces being disposed between the two lateral ends. The intermediate face is then metallised and constitutes the reflector, the exit face constitutes the dioptric surface, and the entry face is situated at a distance from the focus point that is less than 15% of a conical radius of the reflector. In this way, the light beam originating from the focus point enters the block of transparent material through the entry face, undergoes reflection on the intermediate face inside the block, and emerges from the block by passing through the exit face. For such embodiments of the invention and others, the block of transparent material may comprise two fixing portions that are situated at the two opposite lateral ends. Such fixing portions may be adapted so as to fix the block to an external support without obscuring the light beam that enters the block through the entry face, is reflected on the intermediate face, and then emerges through the exit face. Such embodiments of the invention in the form of blocks of transparent material may be produced easily, in particular by moulding materials of the acrylate type.

Another aspect of the invention proposes a lighting assembly that comprises a light emitting diode light source and a lighting lens in accordance with one or more aspects of the invention. In such a lighting assembly, the light source is placed on the focus point of the reflector.

When the lighting lens is formed by a block of transparent material in some embodiments, this may comprise positioning means that are disposed close to the entry face and are adapted so as to maintain the light source in front of this entry face when the light source is engaged in the positioning means. These positioning means may furthermore be adapted so as to determine a spacing between the light source and the entry face of the block of transparent material. Such a spacing may be useful for preventing heat produced by the light source degrading the block of transparent material, or damaging the light source itself. In order to increase the light collection efficiency, the entry face of the block of transparent material may advantageously extend parallel to the light emission zone of the light source when this light source is engaged in the positioning means.

Such a lighting assembly may itself be compact, inexpensive and simple to assemble, while having high light efficiency. Furthermore, it is suitable for illuminating an object plane obliquely, that is to say with an angle between the light beam and a direction perpendicular to the object plane that lies between 0° and 90°.

Other aspects of the invention propose biometric measurement devices that each comprise a lighting lens according to one or more aspects of the invention, or a lighting assembly according to one or more aspects of the invention. In particular, such biometric measurement devices may be skin print capture systems. In this case, the oblique lighting is particularly suitable for increasing a shadow contrast of the ridges and hollows on the skin that form the skin print. In some embodiments of such biometric measurement devices, at least one or more of the following additional features may be used:

the device may further comprise an image capture apparatus that has an optical axis forming an image capture direction, and a lighting distance that is measured between the dioptric surface on the one hand and on the other hand a point of intersection between the axis of the reflector of the lighting lens and the optical axis forming the image capture direction may be between 15 cm and 25 cm along the axis of the reflector;

an angle between the axis of the reflector of the lighting lens and the optical axis forming the image capture direction may be between 24° and 44°; and the light emitting diode may be adapted to produce light flashes which each have a power of at least 2 W (watts) and a duration of less than 0.4 ms (milliseconds). Under these conditions, the image capture apparatus can provide, at each light flash, an image that can be used for biometric measurements.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects, other particularities and advantages of the claimed subject matter will emerge from the following description of a non-limitative example embodiment with reference to the accompanying drawings, in which:

For reasons of clarity, the dimensions of the elements that are depicted in these figures correspond neither to actual dimensions nor to actual dimension ratios. Furthermore, identical references that are indicated in different figures designate identical elements or ones that have identical functions.

DETAILED DESCRIPTION

In accordance with FIGS. 1 to 7, a lighting lens in accordance with an aspect of invention comprises a block 10 of material that is homogeneous, transparent and refringent for visible light. For example, this may be a block of polymethyl methacrylate, or PMMA, one face of which is made reflective, for example by metallization of this face. As is known, the refractive index of PMMA is between 1.48 and 1.51 approximately for visible light and infrared light, corresponding to wavelengths that lie between 0.36 μm (micrometers) and 1.0 μm.

The references used in FIGS. 1 to 7 have the following meanings:

1—entry face for the light
2—intermediate face
3—exit face for the light
4a and 4b—portions for fixing the lighting lens, optional for the invention
5a and 5b—studs, also optional The two portions 4a and 4b are situated on two opposite lateral sides of the block 10 and are intended to facilitate the fixing of the block 10 to an external support. The portions 4a and 4b may have any forms and be provided with piercings, according to the external support.

Between its two opposite sides, the block 10 is delimited by several surfaces, including the entry surface 1, the intermediate face 2 and the exit face 3, which have optical functions. These faces 1 to 3 are disposed so that light rays can enter the block 10 through the entry face 1, be reflected inside the block 10 on the intermediate face 2, and then emerge through the exit face 3.

The entry face 1 may have any form, but preferably it is suitable for increasing the quantity of the light that enters the block 10. In particular, the entry face 1 may be adapted according to the form of an emission zone of a light source that is placed opposite this entry face 1. For example, the entry face 1 may be planar and rectangular, with dimensions 15.2 mm (millimeters) by 7.6 mm, when the light source is a light emitting diode (LED) the emission zone of which is planar with dimensions 4.6 mm by 2.6 mm. The studs 5a or 5b can be situated on either side of the entry face 1 in order to determine the placing of the light source with respect to the block 10. Preferably, they are disposed so that the emission zone of the light source is centred with respect to the entry face 1. They may be replaced by any other form that is suited to the model of the light source that is used, and to the precision that is necessary for placing the light source with respect to the block 10. In particular, such precision may be obtained more easily by reducing the number of different parts that connect the position of the light source to the block 10. Furthermore, the studs 5a and 5b, or the equivalent forms that are used, may advantageously be designed so as to maintain a separation between the emission zone of the light source and the entry face 1 of the block 10. For this purpose, each stud 5a or 5b can be provided with a shoulder at its base that prevents the light source approaching against the block 10 within the height of such a shoulder. This shoulder height may be 1.2 mm for example. In general, the separation between the emission zone of the light source and the entry face 1 of the block 10 may be fixed at between 0.1 mm and 3 mm.

The intermediate face 2 is provided with a reflective coating that procures for it a mirror function for a light ray that is incident on this face 2 inside the block 10. Such a reflective coating may be produced by metallization, for example by deposition of aluminium on the face 2. In the context of one or more aspects of the present invention, metallization means any deposit in the form of a thin layer that produces a high light reflection coefficient for wavelengths of the radiation that is produced by the light source used. This definition also comprises stacks of several layers of different materials the function of which is to produce a high light reflection. For example, this coefficient of reflection may be higher than 95% for a light ray that is reflected close to a central point of the intermediate face 2, and for a wavelength of 540 nm (nanometers).

Figure 1:
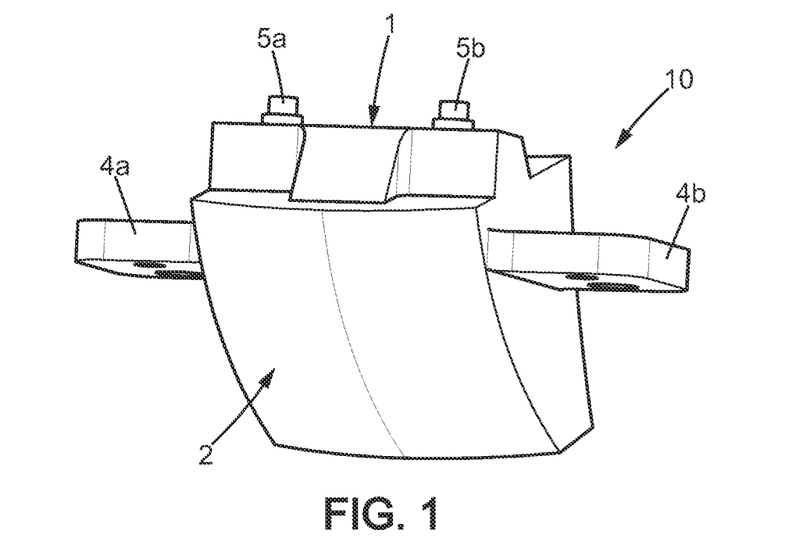
FIGS. 1-7 are views in projection and perspective of the same lighting lens according to the invention.
Figure 2:
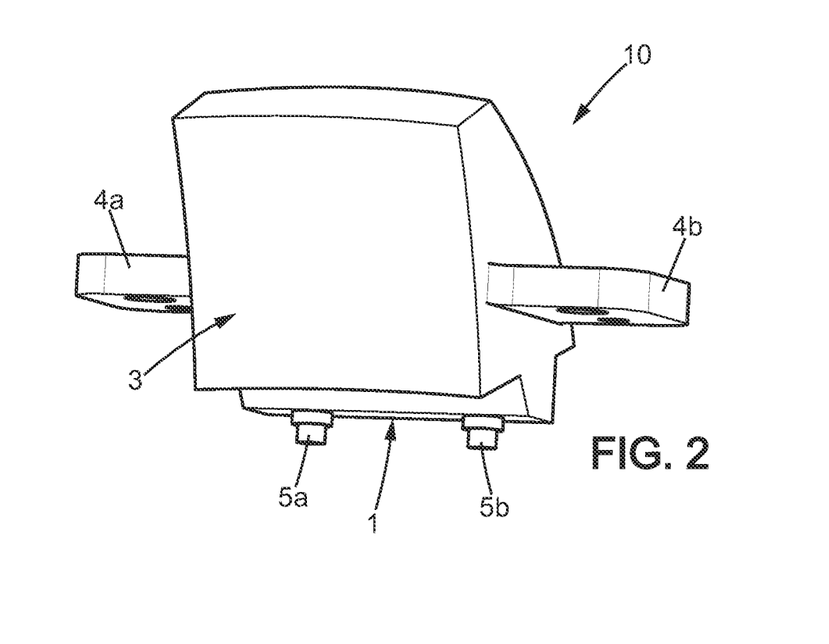
Figure 3:
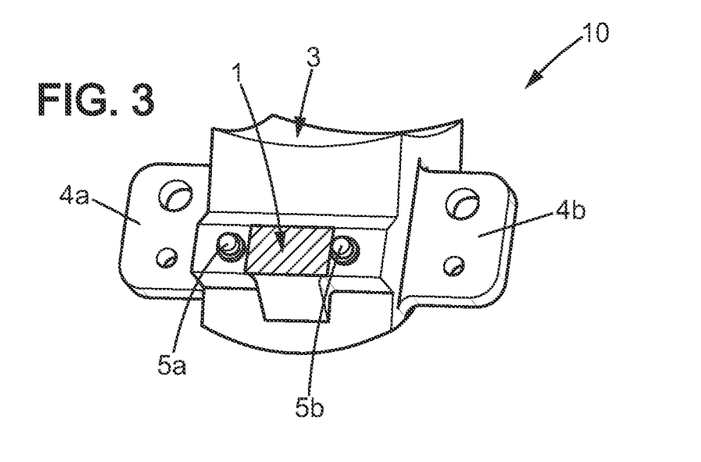
Figure 4:
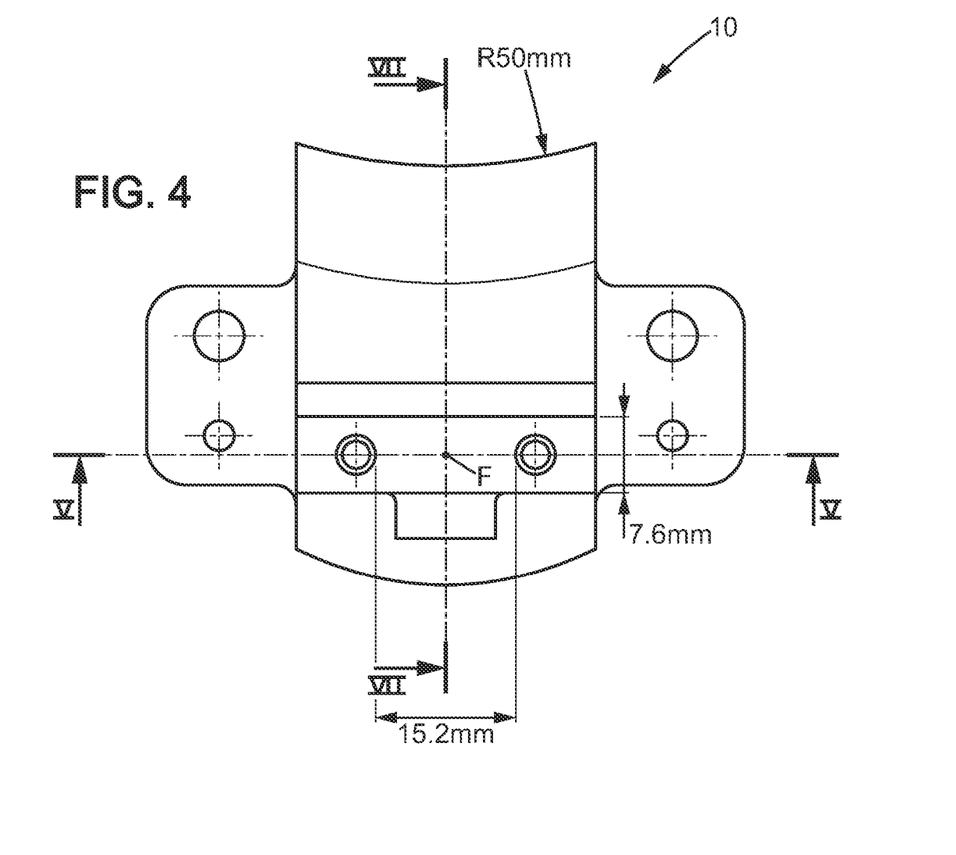
Figure 5:
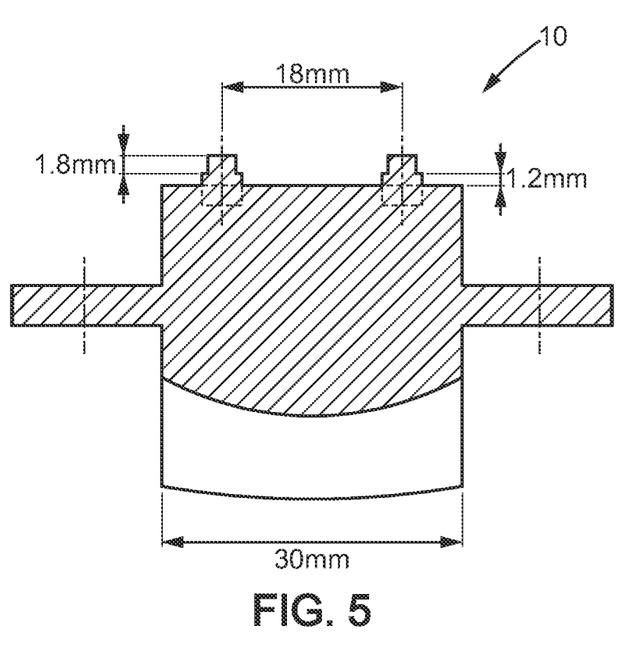
Figure 6:
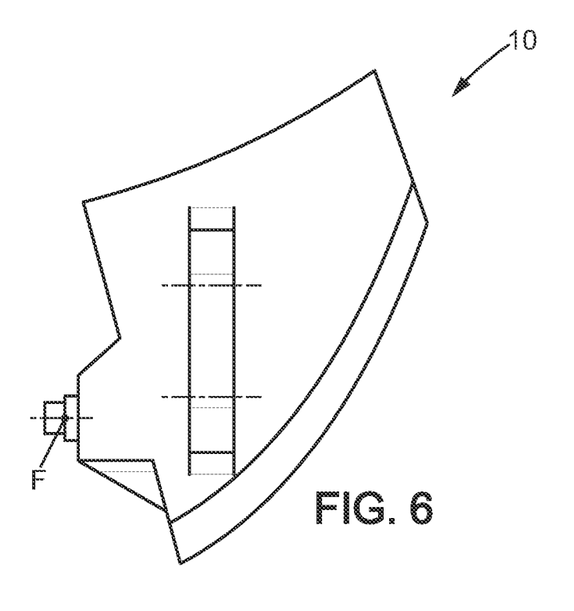
Figure 7:
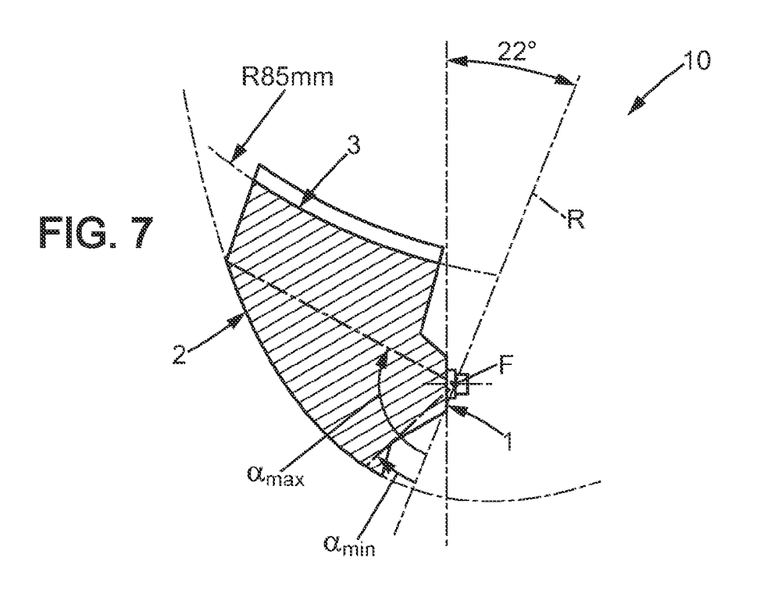

In the embodiment shown in FIGS. 1-7, the intermediate face 2 has the shape of a portion of a paraboloid of revolution, with axis denoted R (FIG. 7). In this way, a light ray that originates from the focus point F of the paraboloid, taking account of the refraction at the entry face 1, is parallel to the axis R just after its reflection on the intermediate face 2. In other words, the reflector that is formed by the intermediate face 2 has a collimator effect. The paraboloid of revolution may have a radius, also referred to as the parabola radius, or parabola parameter or conical parameter, that is around 30.5 mm. A width of this face 2 in the direction that connects the two lateral sides of the block 10 may be approximately 30 mm. In the embodiment of the invention that is illustrated, the paraboloid portion that forms the face 2 is such that a light ray that originates from the focus point F and is reflected on the intermediate face 2 inside the block 10 forms, with the axis R, before reflection, an angle that is between 20° ($\alpha_{min}$ in FIG. 7) and 105° ($\alpha_{max}$) approximately.

The entry face 1 may be inclined by approximately 22° with respect to the axis R (FIG. 7), and the studs 5a and 5b are designed so as to keep the light source light emission zone that is associated with the lighting lens close to the focus point F.

In accordance with one or more aspects of the invention, the exit face 3 has two curvature values that are different in two directions that are perpendicular to each other and parallel to the exit face 3. Thus the exit face 3 consists of a dioptric surface that has non-zero astigmatism. For example, the exit face 3 may have two radii of curvature that are respectively equal to 50 mm (FIG. 4) and 85 mm (FIG. 7), corresponding to the two dioptric power values −10 dioptres and −5.7 dioptres. Thus the exit face 3 has a divergent refractive power that is different for light rays that are contained in the plane of FIG. 7, and for other light rays that are contained in a plane perpendicular to the one in this figure. A light beam originating from the focus point F and having initially a circular cross-section would therefore have a cross-section that is stretched perpendicular to the plane of FIG. 7 after its emergence through the exit face 3.

Figure 8:
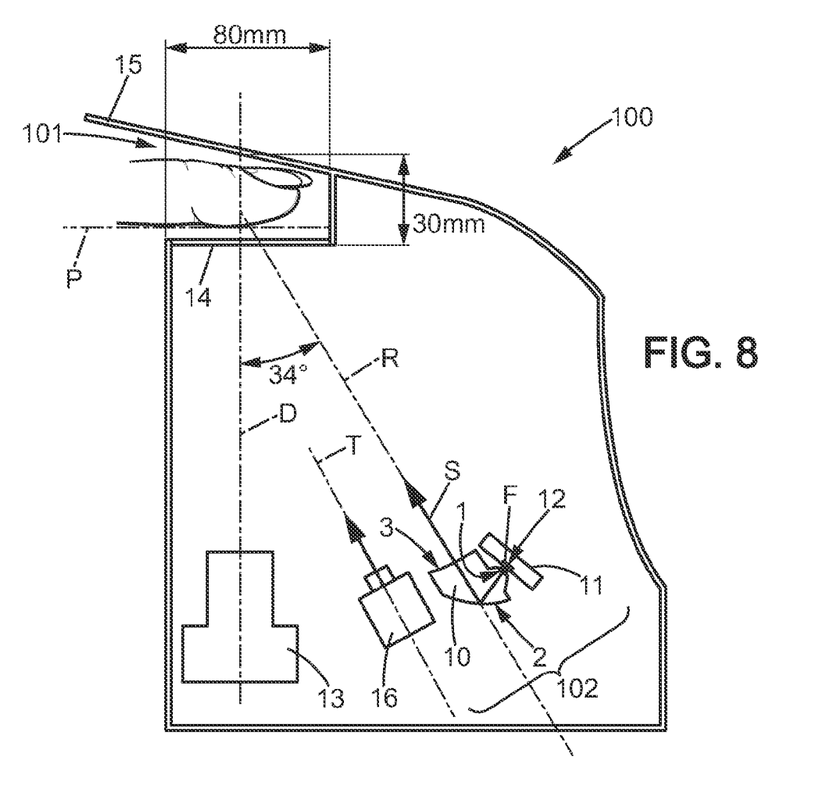
FIG. 8 is an outline diagram of a biometric measurement device according to the invention for capturing skin prints.

FIG. 8 is a view in cross-section of the biometric measurement device that uses a lighting lens according to FIGS. 1-7. Although such a lens can advantageously be used in biometric measurement devices with different principles, skin print photography is taken as an example.

The references indicated in FIG. 8 have the following meanings

100—skin print capture device
101—finger passage zone
102—lighting assembly
10—block of transparent material forming the lighting lens
11—light emitting diode
12—emission zone of the light emitting diode
13—image capture apparatus
14—transparent window
15—hand passage zone cap
16—sight projection system The optical block 10 and the light emitting diode 11 form together the lighting assembly 102. A central point of the emission zone 12 of the light emitting diode 11 is superimposed on the focus point F of the lens 10, for example in the way that was described above using the studs 5a and 5b. S designates a central light ray of the beam that is produced by the lighting assembly 102, and R also designates the axis of the paraboloid of revolution that defines the form of the intermediate face 2 of the block 10. The light ray S is superimposed on the axis R. With the numerical values cited above for the lighting lens, and when the emission zone 12 of the light emitting diode 11 is a rectangle approximately 4.6 mm long and 2.6 mm wide, a light collection efficiency that is greater than or equal to 70% may be obtained.

The ratio between the aforementioned length and width for the emission zone 12 is approximately 1.8, while the lighting beam that is required has an expansion factor of approximately 1.4. For this purpose, the exit face 3 of the block 10 produces a transverse expansion of the beam parallel to its direction with the smallest transverse dimension.

The light beam that is produced by the lighting assembly 102 is directed to the zone 101 through the window 14. The window 14 and the cap 15 delimit the zone 101, into which a user introduces the ends of his fingers so that his skin patterns are captured as an image by the apparatus 13.

The lighting assembly 102 can produce a light beam that is sufficiently intense, and the apparatus 13 has a light sensitivity that is sufficiently high for the duration of exposure that is necessary to be short, or even very short. For example, a lighting flash of 4 W (watts) that is produced by the light emitting diode 11 for 0.2 ms (milliseconds) is sufficient to obtain an image that can be used for fingerprint recognition. The lighting distance between the exit face 3 of the optical block 10 and the zone 101 may be between 15 cm and 25 cm. Under these conditions, the image capture of the skin patterns of the fingers of a user is compatible with a transverse movement of the hand perpendicular to the plane of FIG. 8. It therefore suffices for the user to pass his fingers through the zone 101 for an image of his fingerprints to be captured, with an image quality that is sufficient. Optionally, the quality of the image may be further improved by suitable software processing. In particular, the operating conditions that have just been cited are compatible with a speed of traverse of the zone 101 by the hand of the user that may be as high as 0.5 to 1 m·s$^{-1}$ (meters per second). The device therefore makes it possible to capture the fingerprints of the user "on the flight", while providing an imaging quality that is sufficient.

It is also necessary for the zone 101 to be illuminated with a light intensity that is fairly homogeneous, for dimensions of the zone 101 that are for example 80±10 mm deep and 30 mm high in the plane of FIG. 8, and 40 mm perpendicular to the plane of the figure. Such dimensions are suitable for capturing the skin prints of fingers of the user, up to four fingers during the same passage of the hand through the zone 101. For certain applications requiring a less demanding precision level, the acquisition of up to four fingers is not necessary. The dimensions to the zone 101 can then be significantly smaller. Thus, for one to three fingers, a depth dimension of 25 mm to 40 mm may be sufficient. The width can also be reduced in order to lie between 20 mm and 30 mm, in particular for certain applications where following the movement of the fingers is not essential. The image capture apparatus 13 is also selected so as to have a depth of field that is compatible with variations in height of the surface of the fingers inside the zone 101.

As is known, a contrast of the skin patterns of the image captured is greater when the lighting direction, that is to say the axis R, is oblique with respect to the image capture direction denoted D. The angle between the axis R and the direction D is preferably between 24° and 44°, for example equal to 34°. The direction D is perpendicular to the focusing plane P of the image capture apparatus 13.

A skin print capture device of this type may advantageously be supplemented with a sight projection system 16. The use of such a system 16 is known in particular from the documents FR 2 927 713 and US 2009/208090. For example, the light emitting diode 11 produces a green light and the system 16 produces a red light. The projection direction T of the system 16 is substantially parallel to the axis R. Because of the small size of the lighting assembly 102, the assembly 102 and the system 16 can be disposed close to each other with the axis R and the direction T pointing together towards the zone 101, without using a light beam merger system. The size and the complexity of assembly of the device 100 and its cost price can thus be reduced.

Naturally a lens and a lighting assembly according to one or more aspects of the invention can advantageously be used in systems other than skin print capture devices, in particular when the lighting distance is between 0.5 m (meters) and 2 m. For example, iris pattern capture devices can also incorporate such a lighting assembly. Aspects of the invention are then particularly advantageous for this iris pattern capture application, in particular for the following reasons:

the optical field to be illuminated may be very elongate horizontally, in particular when the two eyes are captured in the same image;

the oblique lighting may avoid the "red eye" effect;

the oblique lighting may also make it possible to shift any reflection towards a point that does not cause any interference, in particular shifting the reflection outside the iris; and the oblique lighting may optionally also increase perception of relief.

Aspects of the invention can also advantageously be applied to systems apart from biometric applications, such as automatic document reading systems, in particular identity documents or game reports.

Naturally aspects of the invention can be also reproduced by modifying secondary aspects thereof, while preserving at least some of the advantages cited. In particular, the lighting lens can be sized according to the size of the emission zone of the light source with which the lens is intended to be used. When this emission zone is square with sides of 1 mm, a homothetic transformation of ratio 1/3 may be applied to the dimensions that were cited with reference to FIGS. 1 to 7, resulting in a paraboloid of revolution for the intermediate face 2, the conical radius of which is approximately equal to 10 mm. The two curvatures of the dioptric surface that is formed by the exit face 3 may then correspond respectively to the refractive power values of −17 dioptres and −30 dioptres.

Finally, various aspects of the invention that have been described in the context of the particular embodiment used as an example can be modified. For example, the placement of the light source with respect to the entry face of the lighting lens can be guided in many ways. Likewise, the lateral fixing portions may be replaced by any number of points supporting the block on an external support. Alternatively, the block can be provided with a support ring that surrounds the entry face and which is intended to come into contact with a dedicated part of the external support.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. Biometric measurement device, comprising:
   a lighting assembly, said lighting assembly comprising: a lighting lens and a light emitting diode light source;
   said lighting lens comprising: a paraboloidal or ellipsoidal reflector formed by a portion of a paraboloid or ellipsoid with symmetry of revolution about an axis of said reflector, and having a focus point; and a dioptric surface arranged so that a light beam that originates from the focus point and is then reflected by the reflector next passes through the dioptric surface, wherein the dioptric surface has two different refractive power values in two directions perpendicular to each other and parallel to said dioptric surface, said two refractive power values being negative;
   said light emitting diode light source is placed at the focus point of the reflector; and
   a skinprint capture apparatus having an optical axis forming an image capture direction, in which an angle between the axis of the lighting lens reflector and the optical axis forming the image capture direction is between 24 degrees and 44 degrees.

2. Biometric measurement device according to claim 1, in which the reflector is a portion of a paraboloid of revolution that has a radius of between 8 mm and 45 mm.

3. Biometric measurement device according to claim 1, in which one of the two refractive power values of the dioptric surface is between 20% and 80% of the other one of said two values.

4. Biometric measurement device according to claim 1, in which a first one of the two refractive power values of the dioptric surface is between −30 dioptres and 0 dioptre, and a second one of the two refractive power values of the dioptric surface is between −40 dioptres and −1 dioptre.

5. Biometric measurement device according to claim 1, comprising a block of transparent material with two opposite lateral ends, with an entry face, an intermediate face and an exit face, the three faces being disposed between the two lateral ends, the intermediate face being metallized and constituting the reflector, the exit face constituting the dioptric surface, and the entry face being situated at a distance from the focus point less than 15% of a conical radius of the reflector,
   so that the light beam that originates from the focus point enters the block of transparent material through the entry face, undergoes reflection on the intermediate face inside said block, and emerges from the block by passing through the exit face.

6. Biometric measurement device according to claim 5, in which the block of transparent material comprises two fixing portions situated at the two opposite lateral ends and suitable for fixing said block to an external support without obscuring the light beam that enters the block through the entry face, is reflected on the intermediate face and then emerges through the exit face.

7. Biometric measurement device according to claim 1, in which the lighting lens comprises a block of transparent material having two opposite lateral ends, an entry face, an intermediate face and an exit face, the three faces being disposed between the two lateral ends, the intermediate face being metallized and constituting the reflector, the exit face constituting the dioptric surface, and the entry face being situated at a distance from the focus point less than 15% of a conical radius of the reflector, so that the light beam that originates from the focus point enters the block of transparent material through the entry face, undergoes reflection on the intermediate face inside said block, and emerges from the block by passing through the exit face;
   wherein the block of transparent material comprises positioning means disposed close to the entry face, and suitable for maintaining the light source in front of said entry face when light source is engaged in said positioning means.

8. Biometric measurement device according to claim 7, in which the positioning means are further suitable for determining a spacing between the light source and the entry face of the block of transparent material, when said light source is engaged in said positioning means.

9. Biometric measurement device according to claim 7, in which the entry face of the block of transparent material extends parallel to a light emission zone of the light source, when said light source is engaged in said positioning means.

10. Biometric measurement device according to claim 1; wherein a lighting distance measured between the dioptric surface on the one hand and on the other hand a point of intersection between the axis of the lighting lens reflector and the optical axis forming the image capture direction is between 15 cm and 25 cm along said axis of the reflector.

11. Biometric measurement device according to claim 1, in which the light emitting diode is configured for producing light flashes each having a power of at least 2 W and a duration of less than 0.4 ms.

12. Biometric measurement device, comprising:
    a biometric detection zone;
    a lighting lens comprising a paraboloidal or ellipsoidal reflector formed by a portion of a paraboloid or ellipsoid with symmetry of revolution about an axis of said reflector, and having a focus point, and a dioptric surface arranged so that a light beam that originates from the focus point and is then reflected by the reflector next passes through the dioptric surface, wherein the dioptric surface has two different refractive power values in two directions perpendicular to each other and parallel to said dioptric surface, said two refractive power values being negative;
    a light source positioned at the focus point of the reflector; and
    an image capture apparatus having an optical axis forming an image capture direction, said image capture apparatus facing the biometric detection zone at an oblique angle to said axis,
    wherein a lighting distance measured between the dioptric surface and a point of intersection between the axis of the lighting lens reflector and the optical axis forming the image capture direction is between 0.5 meters and 2.0 meters along said axis of the reflector.

13. Biometric measurement device of claim 12, wherein the image capture apparatus has an image capture direction that is perpendicular to said focusing plane and oblique with said axis.

14. Biometric measurement device of claim 13, further comprising a sight projection system having a projection direction substantially parallel with said axis.

15. A method for capturing a fingerprint for biometric measurements, the method comprising:

passing at least one finger within a biometric detection zone;

emitting light from a light source having an emission zone;

receiving, by a lighting lens, light emitting from the light source, said lighting lens comprising a paraboloidal or ellipsoidal reflector formed by a portion of a paraboloid or ellipsoid with symmetry of revolution about an axis of said reflector, and having a focus point aligned with the emission zone of the light source, wherein the reflector includes a dioptric surface having two different refractive power values in two directions perpendicular to each other and parallel to said dioptric surface, said two refractive power values being negative;

reflecting, with the reflector, the light received by the lighting lens through the dioptric surface and toward the biometric detection zone;

capturing as an image, with a skinprint capture apparatus, a skin pattern of the at least one finger as the finger passes within the a biometric detection zone and illuminated by the reflected light, the skinprint capture apparatus having an optical axis forming an image capture direction that faces the biometric detection zone at an oblique angle.

16. The method of claim 15, wherein the image capture direction is disposed at an angle of between 24 degrees and 44 degrees with the axis of the reflector.

17. The method of claim 15, wherein said emitting light includes emitting light flashes each having a power of at least 2 W and a duration of less than 0.4 ms.

* * * * *